US006971228B2

(12) United States Patent
Dujarric

(10) Patent No.: US 6,971,228 B2
(45) Date of Patent: Dec. 6, 2005

(54) PROPULSION DEVICE, IN PARTICULAR FOR A ROCKET

(75) Inventor: Christian François Michel Dujarric, Paris (FR)

(73) Assignee: Agency Spatiale Europeenne, Paris Cedex (FR)

( * ) Notice: Subject to any disclaimer, the term of this patent is extended or adjusted under 35 U.S.C. 154(b) by 8 days.

(21) Appl. No.: 10/976,413

(22) Filed: Oct. 29, 2004

(65) Prior Publication Data

US 2005/0166574 A1 Aug. 4, 2005

Related U.S. Application Data

(63) Continuation of application No. 09/492,749, filed on Jan. 27, 2000.

(30) Foreign Application Priority Data

Jan. 27, 1999 (FR) .................................. 99 00880

(51) Int. Cl.[7] .............................................. F02K 11/00
(52) U.S. Cl. .................................................... 60/203.1
(58) Field of Search ................................ 60/203.1, 202

(56) References Cited

U.S. PATENT DOCUMENTS

| | | | |
|---|---|---|---|
| 3,159,966 A | 12/1964 | Curtis | |
| 3,173,248 A | 3/1965 | Curtis et al. | |
| 3,243,954 A | 4/1966 | Cann | |
| 3,928,132 A | 12/1975 | Bujas | |
| 3,992,258 A | 11/1976 | Tobin | |
| 4,431,901 A * | 2/1984 | Hull | 219/121.52 |
| 4,739,200 A | 4/1988 | Oberly et al. | |
| 4,756,873 A | 7/1988 | Schoening | |
| 4,759,911 A | 7/1988 | Bingham et al. | |
| 4,866,929 A | 9/1989 | Knowles | |
| 5,052,638 A | 10/1991 | Minovitch | |
| 5,410,578 A | 4/1995 | Walton | |
| 5,589,758 A | 12/1996 | Blackmon et al. | |
| 5,636,512 A | 6/1997 | Culver | |
| 6,329,587 B1 | 12/2001 | Shoga | |
| 6,367,243 B1 | 4/2002 | Schmidt | |
| 6,417,625 B1 * | 7/2002 | Brooks et al. | 315/111.31 |

OTHER PUBLICATIONS

Thomas L. Ashe, et al., "Closed Brayton Power Conversion System Design and Operational Flexibility", American Institute of Physics, 1992, pp. 884-893.

Stanley K. Borowski et al., "NASA and the Dept. of Energy are Developing Nuclear Rocket Technology for Lunar Outpost Missions and Mars Exploration", Aerospace America, Jul. 1992, pp. 34-48.

S.K. Borowski et al., "Nuclear Thermal Rocket (NTR) Propulsion with a Kick—The LOX-Augmented NTR Concept", pp. 225-232.

Joachim E. Lay, "Thermodynamics—A Macroscopic-Microscopic Treatment", Pitman and Sons, 1964, pp. 564-573.

J. Reboux et al. "Les Plasmas ThermiquesInductifs", Revue Generale De Thermique, Oct. 1987, pp. 534-541.

(Continued)

*Primary Examiner*—Ehud Gartenberg
(74) *Attorney, Agent, or Firm*—Sughrue Mion, PLLC

(57) ABSTRACT

The invention relates to a propulsion device comprising a gas ejection nozzle and an injection chamber for injecting at least one propellant fluid. According to the invention, the device has an induction loop which surrounds a zone of the nozzle and also an electricity generator to feed said induction loop, in particular under drive from a heat engine whose heat source is a nuclear core and whose heat sink is a cryogenic liquid which is subsequently used for propulsion.

4 Claims, 2 Drawing Sheets

OTHER PUBLICATIONS

New Chief Hopes to Guide NASA to Its "Age of Steam" Sean O'Keefe, NASA Administrator, Spacenews Magazine, Sep. 9, 2002, p. 30, at www.spacenews.com.
Sutton, G.P. and Ross, D.M., "Rocket Propulsion Elements", Wiley, New York 1976, pp. 517-519.
The White House, National Science and Technology Council, Fact Sheet National Space Policy, Sep. 19, 1996, Intersector Guidelines, (6) Space Nuclear Power.
Annex 1: Past U.S. missions using RTGs nuclear power in escape orbit, NASA Missions That Have Used RTGs.

* cited by examiner

PROPULSION DEVICE, IN PARTICULAR FOR A ROCKET

This is a continuation of application Ser. No. 09/492,749 filed Jan. 27, 2000, the disclosure of which is incorporated herein by reference.

BACKGROUND OF THE INVENTION

Rocket propulsion is the only means that can be used beyond the atmosphere. The size of a space vessel depends essentially on its specific impulse Isp which is given by the conventional formula:

$$\Delta V = g_0 \cdot Isp ln(m_1/m_0) \quad (I)$$

in which ΔV is the speed increment, $g_0$ is the attraction due to gravity, $m_1$ is the launch mass, $m_0$ is the orbital mass, and ln is the natural logarithm.

Improvements in rocket propulsion are tending to increase this specific impulse, but there are physical limits on this parameter and progress has been very slow over recent decades.

The above formula can be applied in particular to a single stage to orbit (SSTO) spacecraft that has been put into orbit. The speed increment ΔV necessary to reach low earth orbit (LEO) is about 9,000 meters per second, including losses. By convention, the residual mass of fuel can be considered as being a portion of the payload $m_p$. The mass in orbit $m_0$ is the sum of the empty or "dry" mass $m_d$ plus the payload mass $m_p$. With prior art rocket propulsion, it is relatively difficult to obtain sufficient payload when using a spacecraft of the SSTO type.

The present invention proposes providing a quantitative gain in the value of the specific impulse Isp of rocket propulsion while limiting the mass of the rocket engine to reasonable values.

In addition to its possible applications to space launchers starting from the Earth, the present invention can be applied to stages for propulsion in space that come into operation in orbit or starting from other planets, and which may contribute to various missions, such as, for example, a manned Earth-to-Mars mission. The levels of thrust required are then adapted to the mission in question.

In the present state of the art, there are only two solutions which enable a satisfactory ratio to be obtained between the thrust and the mass of the propulsion system. These are chemical propulsion and nuclear thermal propulsion.

Chemical propulsion is well known and is used by all launchers presently in operation. At present the highest-performance engines use multistage combustion.

The present limits on specific impulse Isp performance of chemical propulsion are due to physical limitations, the most important of which is the choice of propellant. The best known is the combination of liquid hydrogen and liquid oxygen. Small improvements can be obtained by increasing the pressure in the combustion chamber, but at the cost of increased technological difficulties. The space shuttle main engine (SSME) for the US space shuttle presents results that are the best that have presently been obtained in terms of specific impulse Isp. That is why the SSME is used as a reference when studying and comparing the embodiments proposed in accordance with the present invention.

The technical characteristics of the SSME are as follows:

mass flow rate q=468 kg/s
chamber pressure Pc=207 bars
mixture ratio=6
nozzle outlet diameter=2.39 m
expansion ratio=77
specific impulse Isp=455 s
thrust F=2090 kN
mass of engine=3 (metric) tonnes.

The calculated pressure Pe at the nozzle outlet is about 0.176 bars.

To make comparison easier, the comparisons given below with the embodiments of the present invention have been obtained for the same mass flow rate, for the same chamber pressure, and for the same nozzle outlet pressure.

Nuclear thermal propulsion presents a specific impulse which is greater than that which can be produced by chemical propulsion. The heat generated by a nuclear reactor is transferred directly to an expelled gas which is supplied by tanks. In general, the gas is hydrogen because it has the lowest molecular mass.

Nuclear thermal propulsion was actively developed in the United States during the 1960s in the context of the NERVA program, and more recently in the context of the Timberwind program. A test installation was implemented on the ground and, over a period of 1 hour, it delivered thrust of 30 tonnes with an impulse Isp of 800 seconds. In-depth studies were also performed in Russia and tests were made on subsystems.

Programs relating to nuclear thermal propulsion are presently going slowly. One possible explanation is that in order to perform better than chemical rockets in terms of impulse Isp, it is necessary to take high risks both in programming terms and in safety terms. Specifically:

achieving impulse Isp significantly greater than that generated by present-day stages that burn liquid oxygen and liquid hydrogen implies that nuclear thermal propulsion must have the highest possible temperatures and very high pressures at the interface between the nuclear core and the outlet gases; the required performance would push technology to its limits in a portion of the engine that is critical from the safety point of view; and it is difficult to make the internal temperature of the nuclear core uniform; as a result there is a risk of the engine being degraded because temperature margins are small compared with the technological limits of the materials.

Furthermore, the use of a nuclear thermal engine has been envisaged until now solely for interplanetary missions, given that for an orbital mission, non-recoverable launcher debris will fall out on Earth. At the time when that type of propulsion was being studied, recoverable launchers were a long way from becoming available.

At present, and for all existing types of rocket, thrust is obtained by a gas at high pressure expanding, which gas is heated to a high temperature by a single source, whether chemical or nuclear. There are technical limits on the heating of gas, thus giving rise to limits concerning specific impulse Isp.

It will be observed that until now, the use of diversified heat sources or the introduction of heat at different locations has not been tried.

There are patents which describe a "magneto-plasma-dynamic" (MPD) technique which consists in accelerating electrons or ions present in the outlet flow.

Such acceleration is obtained by creating a force which is the result of the combined action of a current i and a magnetic field B. That type of propulsion often operates at high frequency, or in pulsed mode with pulses of duration of millisecond order.

Such a technique is described in particular in U.S. Pat. No 3,173,248 (Curtiss) and U.S. Pat. No 5,170,623 (Dailey).

Most devices implementing the MPD technique require special dispositions (diverging fields in the nozzle, current injection via electrodes that are generally coaxial with the flow; or else self-induced current derived from special modulation of the current flowing in the field winding).

Rocket engines implementing the MPD technique make it possible to obtain high specific impulse Isp (of the order of several thousand seconds), but the thrust obtained is very low (of the order of a few tens of N, only). Consequently, the mean weight/thrust ratio for such devices in the present prior art is most unfavorable (about 1000).

OBJECTS AND SUMMARY OF THE INVENTION

An object of the present invention is to overcome, at least in part, the limits stated above concerning specific impulse and/or technological constraints on temperature and/or energy efficiency.

To this end, the invention provides a propulsion device comprising an injection region or chamber for at least one propellant fluid, which chamber is disposed upstream from a gas injection nozzle, the device having an induction loop surrounding a zone of the nozzle to heat the ejected gases, and having a high frequency electricity generator for powering said induction loop.

The induction loop serves to create annular currents which heat the plasma by the Joule effect, i.e. the magnetic field is used directly to produce heat (and the energy losses in the electrical circuit are reinjected into the propellant fluid) in contrast to producing force using the MDP technique (where, in the present state of the art, energy losses accumulate in the form of heat in the electrical or electronic circuits which are intrinsically more difficult to cool). The propulsion force is obtained by the subsequent expansion of the gases heated in the nozzle, thereby converting heat energy into translation energy (or thrust).

Advantageously, the nozzle presents a diverging region disposed downstream from the induction loop.

In addition to implementing the system for heating the ejection gases by induction, the device of the invention can operate in particular on a fluid stored in cryogenic form, and/or with a source of energy such as a nuclear source which produces heat and mechanical energy, the mechanical energy driving the electricity generator.

In addition to the fact that it is possible to supply at least a portion of the energy in the diverging region of the nozzle by means of induction heating, it is also possible in the context of the present invention:

to supply energy to the propellant gas from a chemical reaction; and/or to supply a portion of the energy to the propellant gas from a heat source, in particular a nuclear source, situated upstream from the injection chamber.

More particularly, embodiments of the invention relate to engines that operate on two types of thermodynamic cycle, specifically an induction nuclear chemical rocket engine, or an induction nuclear thermal rocket engine.

A particular object of the invention is to use an induction loop to inject as much as energy as possible into the flow ejected by the nozzle so as to increase the impulsion Isp and/or the thrust T. This improvement in performance naturally has a cost, which is the increase in the mass of the thruster compared with prior art solutions.

At least one of said fluids can receive heat upstream from its injection into said injection region, by using a heat exchanger for cooling the nozzle and/or the injection region.

At least one of said fluids can feed at least a first heat exchanger for cooling the electricity generator.

In a first aspect, the device of the invention is of the chemical type, and in particular of the nuclear chemical type, and to this end it has an injection chamber presenting a first inlet for a first propellant fluid (e.g. $H_2$) and a second inlet for a second propellant fluid (e.g. $O_2$), which fluids penetrate into the injection region and react chemically to produce heat, the injection chamber constituting a combustion chamber.

In particular, the device can be of the induction nuclear chemical type, and to this end it can have a nuclear core which constitutes a heat source for a heat engine which is coupled to the electricity generator, and at least one of said propellant fluids is supplied in cryogenic form and passes through at least a second heat exchanger to constitute a heat sink for the heat engine.

In which case, at least one of said propellant fluids feeds at least a third heat exchanger which is heated by said nuclear core and which is disposed downstream from said second heat exchanger.

The heat engine can drive at least one pump for circulating and pressurizing at least one of said propellant fluids.

In another preferred embodiment, the heat engine is of the closed circuit type, in particular one using the Brayton cycle, with a working fluid which is compressed by a compressor and which causes a turbine to rotate which drives the electricity generator. The heat engine has a heat sink which is constituted by said first and second propellant fluids and a heat source which is constituted by said nuclear core.

In another variant of induction nuclear chemical propulsion, the device comprises a nuclear core, a compressor, and a turbine which drives at least the compressor and an electricity generator, and the first propellant fluid which is supplied in cryogenic form, also serves as a working fluid and is directed through a circuit comprising the following in succession from upstream to downstream:

a) said compressor where it is compressed;

b) the nuclear core where it is heated;

c) the turbine in order to drive it;

d) the nuclear core again where it is heated; and e) the first inlet of the injection chamber.

In this configuration, the first fluid, in particular hydrogen, is used to drive the turbine which in turn supplies mechanical energy to the compressor and above all to the electricity generator, but in contrast to the preceding case, the cycle is open since the first fluid which is used for driving the turbine is then ejected through the nozzle.

In a second aspect, the invention relates to an induction thermal propulsion system and the injection chamber has a single inlet for a propellant fluid in gaseous form.

In a preferred variant, the device comprises a heat engine of the closed circuit type, in particular one implementing the Brayton cycle, with a working fluid which is compressed by a compressor and which causes a turbine to rotate which drives in particular the electricity generator, and a heat sink which is constituted by said working fluid and a heat source which is constituted by a nuclear core.

In another variant of induction nuclear chemical propulsion, the device comprises a nuclear core, a compressor, and a turbine which drives at least the compressor and an electricity generator, and said fluid which is supplied in cryogenic form is directed through an open circuit comprising the following in succession from upstream to downstream:

a') said compressor where it is compressed;

b') the nuclear core where it is heated;

c') the turbine in order to drive it;

d') the nuclear core again where it is heated; and e') said inlet of the injection chamber.

BRIEF DESCRIPTION OF THE DRAWINGS

Other characteristics and advantages of the invention will appear better on reading the following description, given by way of non-limiting example and with reference to the drawings, in which.

MORE DETAILED DESCRIPTION

Figure 1:
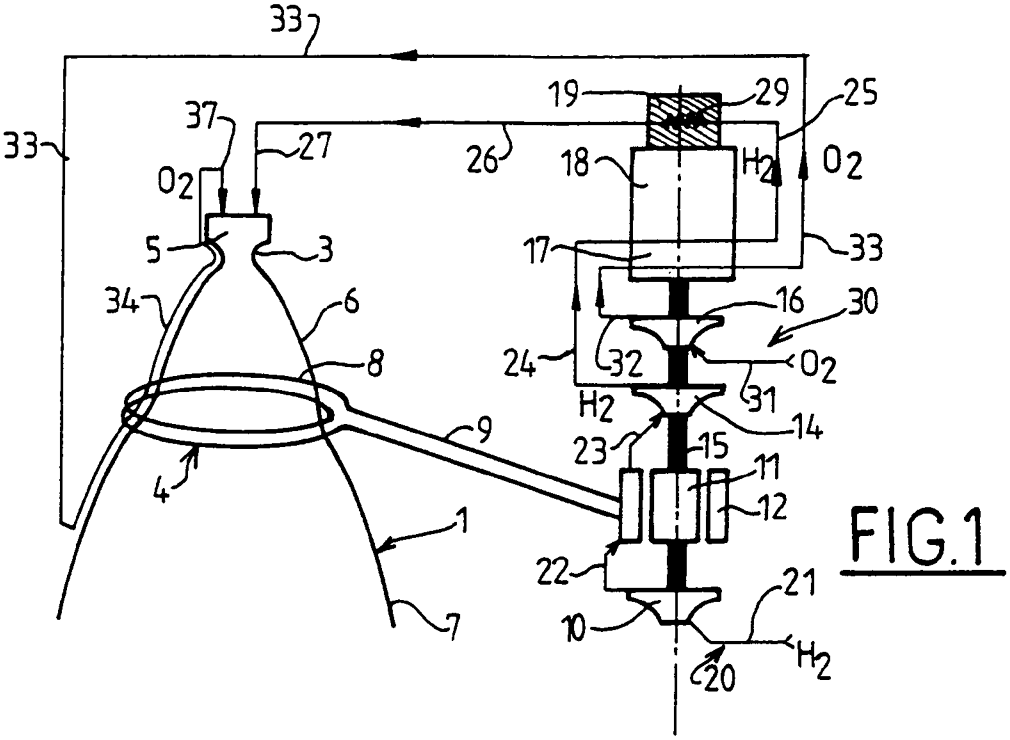
FIGS. 1 to 3 show three embodiments of the invention relating to induction nuclear chemical propulsion.

The propulsion device of induction nuclear chemical type shown in FIG. 1 has a hydrogen circuit 20 which comprises a duct 21 for feeding hydrogen to a pump 10 which feeds a duct 22 and whose outlet is connected to the inlet of a cooling circuit 12 for cooling an electricity generator 11. The cooling circuit 12 has an outlet connected to a duct 23 which feeds a pump 14 which directs hydrogen via a duct 24 causing it to pass through a heat exchanger 17 where it serves as a heat sink for a heat engine 18, after which, in order to be heated, a duct 25 causes it to pass through a heat exchanger 29 of a nuclear core 19 which serves as a heat source for the heat engine 18. Downstream from the nuclear core 19, the duct 26 directs the gaseous hydrogen to a duct 27 for feeding an injection chamber 5 disposed upstream from a nozzle 1 which has a throat 3 and which flares progressively at 6 and at 7, the flared regions 6 and 7 being separated by a region 4 in which an induction loop 8 is disposed, the loop 8 being powered via a power line 9 by the electricity generator 11 which produces electricity at high frequency (e.g. of the order of several tens of kHz), which electricity can have a waveform that is sinusoidal, in particular, and more particularly sinusoidal and of constant amplitude, or more generally it can have any waveform suitable for producing heating by induction.

The conversion of the heat as produced by the loop 8 and communicated to the plasma is then converted into thrust in the flared region 7 situated downstream from the induction loop 8.

The heat engine 18 whose heat source is the nuclear core 19, and whose heat sinks are the hydrogen and the oxygen passing through the heat exchanger 17 is coupled to a shaft 15 which drives the pumps 10 and 14 for circulating hydrogen, the electricity generator 11, and a pump 16 for circulating oxygen.

The oxygen travels along a circuit 30 which includes a feed duct 31 upstream from the pump 16, a duct 32 downstream therefrom so that it also passes through the heat exchanger 17 to constitute a heat sink for the heat engine 18, and then a line 33 downstream from the heat exchanger 17, and possibly then through a counterflow heat exchanger 34 around the flared regions 6 and 7 of the nozzle and around the injection chamber 5 in order to cool them, and finally an injection duct 37 into the injection chamber 5 which feeds the nozzle 1.

A portion of the mechanical power produced by the heat engine 18 thus serves to drive the turbopumps 10, 14, and 16, while the main portion of said power is used to drive a high power and high frequency electricity generator 11.

As shown in FIG. 1 and by the above description, all of the losses of the system are in the form of heat which is conveyed by the propellant fluids to the outlet 7 of the nozzle, thereby contributing to the energy supplied to the propellant gases. The heat exchanges can be optimized so as to avoid two-stage operation of the turbopumps and so as to minimize the total weight of the turbopumps.

Thus, after serving as a heat sink for the heat engine 18, the hydrogen and possibly also the oxygen is/are heated by the nuclear core 19 up to a temperature that is compatible with technological limits. In the example described, the oxygen is not heated by the nuclear core. It can therefore be used to cool the nozzle and the injection region in a counterflow heat exchanger 34 operating on the propulsive jet.

The hot hydrogen and the heated oxygen are introduced into the combustion chamber 5 and react together, with the enthalpy of combustion raising the temperature by about 3600 K for a mixture ratio of about 6. The gases are exhausted through the throat 3 where expansion is initiated and where the gas flow begins to cool through the flared regions 6 and 7.

A magnetic loop 8 is disposed around the expansion region 6, 7 and it is powered with high frequency electricity. This loop 8 generates a varying magnetic field which in turn generates electrical currents in the outlet plasma, thereby heating it. This flow continues to expand in the flared region 7 until a low static pressure is obtained.

If it is assumed that the heat produced by the nuclear core 19, including mechanical and electrical losses, and the heat generated by the combustion is all to be found in the outlet flow, then an approximate value for the speed Ve of the outlet gas is given by applying the principle of conservation of energy by means of the following formula:

$$Ve = \sqrt{2E_0\left(Tc + \frac{P_N}{qE_0}\right)\left(1 - \left(\frac{Pe}{Pc}\right)^{\frac{\gamma-1}{\gamma}}\right)} \quad \text{(II)}$$

where R=8.316 J/mole K, and $\gamma \approx 1.212$, to take account of the effects of the gas dissociating at the outlet from the nozzle.

In this formula, Pc designates the pressure in the combustion chamber, Pe designates the outlet pressure of the gas, and $P_N$ designates the power delivered by the nuclear core 19.

$P_N = P_M + P_R$ where $P_M$ designates the power supplied by the engine 18 and $P_R$ designates the power supplied by heating.

q designates the total mass flow rate.

For a mixture ratio of 6, the molar mass M is equal to 14 grams (g).

E is given by the following formula:

$$E = E_0 Tc = \frac{R}{M}\left(\frac{\gamma}{\gamma - 1}\right) \quad \text{(III)}$$

E is the chemical enthalpy (Tc≈3600 K).

The thrust T and the specific impulse Isp are then obtained by taking account of the static pressure Pe of the flow at the outlet from the nozzle 1.

$$Isp = \frac{V_e}{g_0} + Pe\frac{Ae}{qg_0} \text{ and } T = qIspg_0 \quad \text{(IV)}$$

where:

Ae is the outlet sectional area of the nozzle; and $g_0$=9.81 m/s$^2$.

The invention makes it possible to accept moderate technological requirements for each of the elements in the system, while nevertheless obtaining specific impulse Isp which is relatively high because their effects add together.

In particular, moderate temperatures are selected for the nuclear core 19 so as to make its operation safe. In addition, the power supplied by the electricity generator 11 is injected into the propulsive flow in a region 4 where the flow has already cooled by expanding. This makes it possible to obtain very high total enthalpy 13 while limiting problems of walls overheating in the throat 3 of the nozzle 1.

For the nuclear core 9, the recommended concept is a particle bed reactor that enables a core temperature of 3000 K to be reached with a power density of 40 MW per liter (MW/l) and a specific mass of 0.3 to 0.5 MW per kilogram (MW/kg). Reference can be made in particular to the article by Borowski et al. entitled "Nuclear thermal rockets", published in Aerospace America, page 34, July 1992.

In the context of the present invention, it is possible to keep the core temperature down to 2000 K, the power density down to 25 MW/l, and the specific mass down to 0.2 MW/kg.

The technique of heating a plasma by induction has been known for more than a century and it is presently used in industry, in particular in methods for making materials that are very pure. Reference can be made in particular to the article by J. Reboux, entitled "Les plasmas thermiques inductifs" [Inductive thermal plasmas], published in Revue Générale de Thermique, No. 310, October 1987.

In the intended application of the invention, the induction loop is wound around the expansion nozzle 6, 7. For example, given that rocket expansion nozzles are already known in the form of a bundle of cooling tubes that are welded to one another, it is possible to conserve the principle of a wound tube that is cooled by an internal flow of liquid hydrogen and that constitutes both the nozzle proper and the induction loop. In the context of the present concept, the turns of the tube cannot be welded together, and they must be held together by an insulating material that is not permeable to gas. Such a design also offers the possibility of implementing a superconductive electrical circuit, i.e. a circuit having no electrical losses, for exhausting the heat generated or recovered by the circuit.

As explained in the article by J. Reboux, there exists an optimum frequency at which the number of turns constituting the energy transfer loop is at a minimum. This frequency is a function of nozzle diameter. In the present case, the optimum frequency is about 60 kHz for a diameter of about 0.7 meters.

A speed of rotation of 30,000 revolutions per minute (rpm), which is representative of the normal speed of rotation of a turbopump, makes it possible to produce electricity directly at a high frequency and reach a frequency having the same order of magnitude as that required without requiring the presence of a complicated frequency converter from low frequency to the required high frequency. In industrial applications, it is known that frequency converters present a large amount of mass and also suffer from the drawback of poor energy efficiency for an induction heating system.

Figure 2:
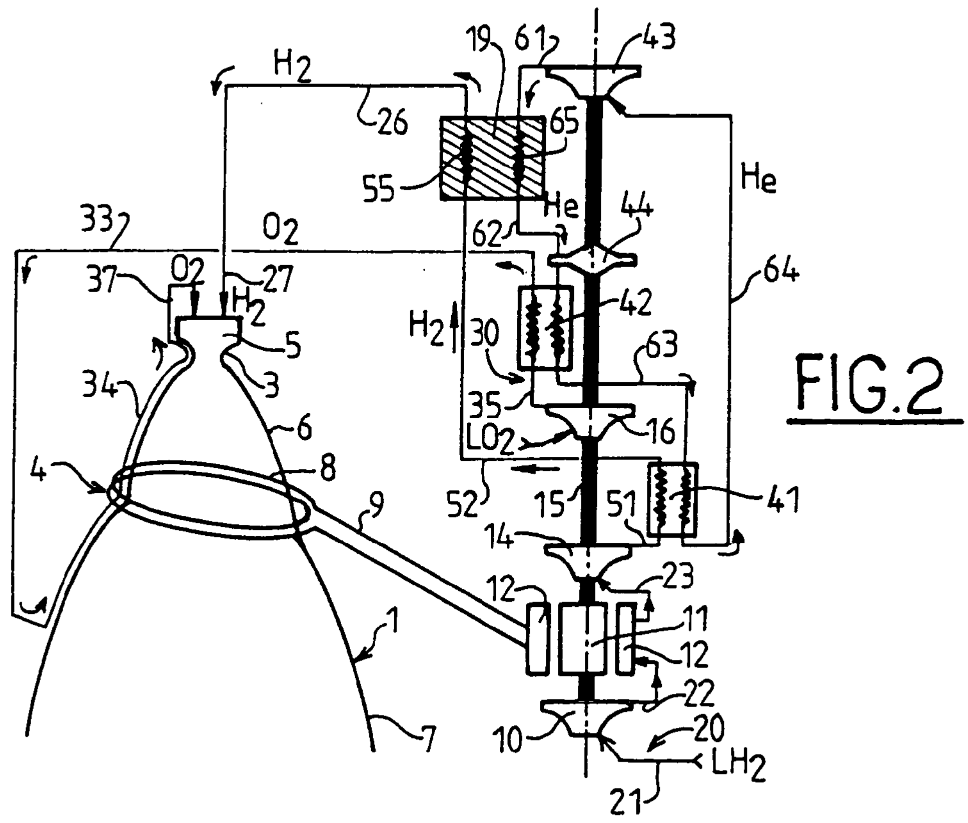

FIG. 2 shows an induction nuclear chemical propulsion design provided with an independent energy generation loop.

This concept implements a heat engine having a closed cycle with a working fluid, e.g. helium, that is subjected to a Brayton cycle. A heat exchanger 65 disposed in the nuclear reactor serves as a heat source and heats the fluid to a temperature of about 2000 K. This temperature is compatible with current technology suitable for turbine zones in a helium environment. The heat sink is constituted by two heat exchangers in series, a heat exchanger 42 using cryogenic oxygen, and a heat exchanger 41 using cryogenic hydrogen. Given that the temperature of hydrogen in its cryostat is about 20 K, it can be assumed that when account is taken of the cooling of the electricity generator 11, e.g. a superconductive generator, and also of the heat losses through the heat exchanger, the temperature of the fluid such as helium in the loop can be lowered to about 60 K at the inlet to the compressor 43.

At the outlet from the heat exchanger 65, the helium raised to a temperature of about 2000 K passes via a duct 62 to feed a turbine 44 which produces the mechanical energy required for driving the pumps 10, 14, and 16, the electricity generator 11, and also, of course, the compressor 43 in the loop, said drive being provided via the shaft 15. At the outlet from the turbine 44, the duct 63 causes the helium to pass in succession through the heat exchanger 42 and the heat exchanger 41, after which the duct 64 returns the helium to the inlet of the compressor 43 such that the duct 61 returns it to the heat exchanger 65, and so on.

The hydrogen circuit 20 is as follows: duct 21, pump 10, heat exchanger 12 for cooling the electricity generator 11, pump 14, duct 5', heat exchanger 41, and then, via the duct 52, the heat exchanger 55 for being heated by the nuclear core 19, and then line 26 for feeding, at 27, the injection inlet 5 of the nozzle 1 upstream from its throat 3.

The oxygen circuit 30 is as follows: pump 16, duct 35, heat exchanger 42, duct 33 to the nozzle which is cooled in counterflow at 34, and fed, at 37, into the injection region 5 of the nozzle 1 upstream from its throat 3.

The compression ratio of the Brayton cycle can be selected so as to optimize the efficiency of the power loop. This optimum ratio ropt is given by the following formula:

$$r_{opt} = \left(\frac{T_3}{T_1}\right)^{\frac{\gamma}{2(\gamma-1)}} = 82.2 \quad \text{(V)}$$

for $T_3$=2000 K and $T_1$=60 K.

The efficiency of the power loop is then given by the following formula:

$$\eta = 1 - \sqrt{\frac{T_1}{T_3}} = 0.827 \quad \text{(VI)}$$

This high efficiency of the power loop can be explained by the fact that the cycle operates between two extreme temperatures.

The temperature $T_4$ at the outlet from the turbine is given by the following formula:

$$T_4 = T_3 \Big/ r_{opt}^{\frac{\gamma-1}{\gamma}} = 346 \text{ K} \tag{VII}$$

This temperature is suitable for cooling in cascade with oxygen and with hydrogen. To a first approximation, and assuming the gases to be perfect, the following temperature variations are obtained: the helium is taken from 346 K to 200 K in the oxygen heat exchanger 42, and then down to 60 K in the hydrogen heat exchanger 41. As a result, the oxygen is heated from about 90 K to about 326 K and the hydrogen from 40 K to 180 K. For a mass flow rate of 468 kg/s, the following characteristics are obtained:

| | | |
|---|---|---|
| | oxygen at 401 kg/s | |
| ΔT = 236K | Cp = 917 J/kgK | L = 213,000 J/kg |
| | hydrogen at 66.9 kg/s | |
| ΔT = 140K | Cp = 14300 J/kgP | L = 450,000 J/kg |

$H = H_{O2} + H_{H2} \approx 336$ MW
Cp: coefficient of compressibility at constant pressure.

The accuracy of this calculation can be improved by taking account of the real properties of the fluids. Given that the heat flows transferred through the heat exchangers are losses from a heat engine whose efficiency η is 0.827, the total power Pm and the available mechanical power Pmec are:

$$Pm = \frac{336}{0.173} = 1.94 \text{ GW}$$

and $$Pmec = 0.827 \times 1.94 = 1.74\ GW$$

The mechanical power is used by the turbopumps 10, 14, and 16 and by the electricity generator 11. The turbopumps 10 and 14 pumping the hydrogen need about 30 MW while the turbopump 16 pumping the oxygen needs 9 MW. This is practically negligible compared with the total power available.

Given that the electricity can be produced in superconductive manner, and that the remaining losses are used to heat the flow in the cooling circuit, it can be assumed to a first approximation that this power is used almost entirely for induction heating in the loop 8 disposed around the region 4 of the nozzle 1.

The total power $P_N$ delivered by the nuclear core 19 is equal to the sum of the power it delivers to the helium loop Pm plus the power Pr it delivers for heating the hydrogen.

The following apply:

$$Pr(2000-180) \times 14{,}300 \times 66.9 = 1.74\ GW$$

$$P_N = Pr + Pm = 3.68\ GW$$

Applying the above formulae gives the following results for an engine which is comparable to an SSME type engine in terms of mass flow rate and outlet pressure:

Ve=5340 m/s

Isp=561 s

T=2580 kN

The mass $m_c$ of the nuclear core 19 is about:

$$m_c = \frac{3680}{0.2} = 18{,}400 \text{ kg}$$

This mass does not take account of the mass of the protective shields that may be necessary if a crew is present, and depending on the distance of the crew from the nuclear core 19.

Since the turbopumps 10, 14, and 16 are driven using nuclear energy, under normal operating conditions the fluid flows of the propellants are proportional to the nuclear power delivered, such that all of the operating temperatures can be considered as being constant. As a result, the engine is easy to control with control of the nuclear reaction being used as the only control parameter.

Figure 3:
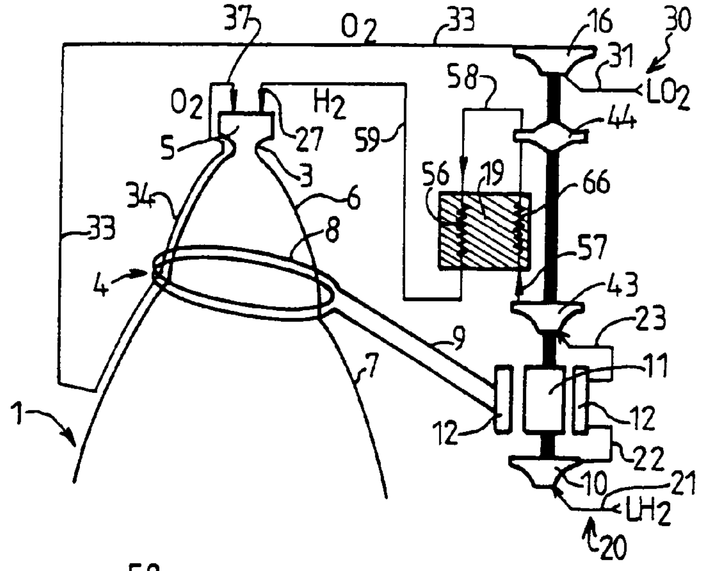

FIG. 3 shows an induction nuclear chemical propulsion device with direct injection. The Brayton type machine uses one of the fluids, in this case the hydrogen, but it operates in an open loop since the hydrogen is then delivered to the nozzle.

The hydrogen circuit 20 thus comprises a feed duct 21, the pump 10, the duct 22, the heat exchanger 12 for cooling the electricity generator 11, the duct 23, then the compressor 43, and via a duct 57, a heat exchanger 66 with the nuclear core 19 followed by a duct 58 which causes the hydrogen to pass through the turbine 44 to drive it and then returns it to the nuclear core where it is heated in a heat exchanger 56, after which it passes via a duct 59 and is brought at 27 to the injection chamber 5 situated upstream from the throat 3 of the nozzle 1 and forming a combustion chamber.

The oxygen circuit 30 is reduced to the feed duct 31, the pump 16, the duct 33, and the counterflow 34 around the regions 6 and 7 of the nozzle 1 and around the injection chamber 5, after which the oxygen is injected into said injection chamber via the duct 37.

The concept of FIG. 3 has the advantage of avoiding fluid/fluid heat exchangers, thereby making it possible to reduce the on-board mass. However, it suffers from the drawback that the turbine 44 cannot expand the hydrogen to below the pressure of the combustion chamber 5. Consequently, and in order to extract sufficient mechanical power while keeping down the pressure of the power loop where it passes through the nuclear core 19, the pressure in the combustion chamber 5 is restricted, which means that this concept cannot be used at atmospheric pressure with a sufficient expansion ratio, and that use thereof is therefore limited to the upper stages of a spacecraft.

To obtain an order of magnitude for possible operating parameters, it is assumed that the hydrogen as compressed by the pump 10 reaches the inlet of the compressor 43 at a pressure which is equal to the pressure of the combustion chamber 5. As a result, the thermodynamic cycle of the hydrogen is exactly a Brayton cycle as in a closed loop. It is possible to select 400 bars as the limit pressure $P_2$ for the nuclear core 19, and 10 bars as the lowest pressure $P_1$ which can be obtained in the combustion chamber S. The efficiency η of the Brayton cycle is given by:

$$\eta = 1 - r_P^{\frac{1-\gamma}{\gamma}} = 0.651 \quad \text{(VIII)}$$

with:

$$r_P = \frac{P_2}{P_1},$$

and $\gamma=1.4$ $P_2=400$ b $P_1=10$ b

If the temperature $T_1$ of the hydrogen at the inlet to the compressor 43 is equal to 40 K, its temperature $T_2$ at the outlet from the compressor is given by:

$$T_2 = T_1\left(\frac{P_2}{P_1}\right)^{\frac{\gamma-1}{\gamma}} = 115 \text{ K} \quad \text{(IX)}$$

The hydrogen is heated up to $T_3$=2000 K in the nuclear core 19 and is then expanded in the turbine 44 where it cools down to a temperature $T_4$ where:

$$T_4 = T_3\left(\frac{P_4}{P_3}\right)^{\frac{\gamma-1}{\gamma}} = 697 \text{ K} \quad \text{(X)}$$

The heat Pm supplied by the core 19 to the heat engine is thus:

$$Pm=14{,}300\times(2000-115)\times669=1.8\ GW$$

and the mechanical power available is thus:

$$Pmec=0.651\times1.18=1.17\ GW$$

The mechanical power is consumed by the turbopumps 10 and 16 and by the electricity generator 11 which feeds the loop 8 disposed around the region 4.

In this case also, the power which is used by the turbopumps is negligible compared to the power which is consumed by the electricity generator 11, which power is assumed to be employed in full in the form of heat at the outlet from the nozzle 1.

After passing through the turbine 44, the hydrogen is thus again heated by the nuclear core in the heat exchanger 56, and its temperature is raised from 697 K to 2000 K. The power Pr delivered to the hydrogen on this occasion is equal to:

$$Pr=14{,}300\times(2000-697)\times669=1.25\ GW$$

And the total power $P_N$ delivered by the nuclear core is equal to:

$$P_N=Pm+Pr=3.05\ GW$$

By applying the formulae given above, it is possible to deduce the performance that would be supplied by an engine having the same mass flow rate and the same expansion ratio as an engine of the SSME type:

Ve≈5160 m/s

Isp=256 s

T=2415 kN

Given that the pressure of the combustion chamber is reduced by a factor of about 20 compared with that which exists in an engine of the SSME type, the size of the nozzle must be increased by a factor which is substantially equal to 4.5 in order to maintain the same expansion ratio. However, a smaller expansion ratio may turn out to be sufficient in practice.

The mass of the nuclear core 19 required for the FIG. 3 engine is about:

$$m_c = \frac{3050}{0.2} \approx 15{,}000 \text{ kg}$$

Figure 4:
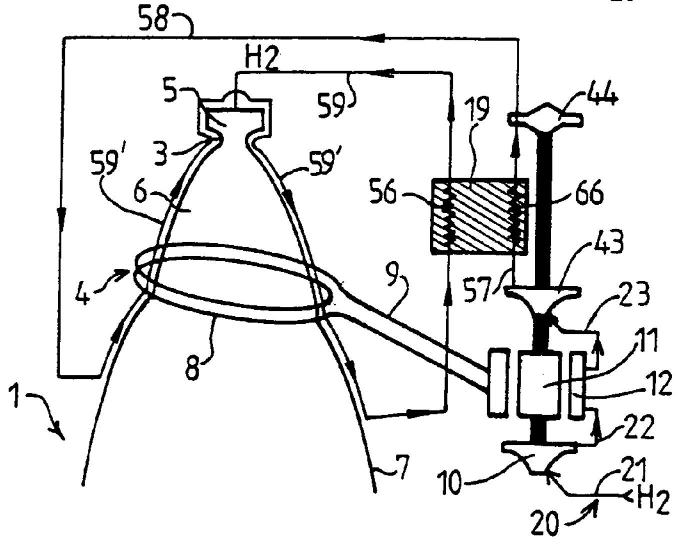
FIGS. 4 and 5 show two embodiments of the invention relating to induction nuclear thermal propulsion.

FIG. 4 relates to an induction nuclear thermal device. A single fluid is used, in this case hydrogen. The hydrogen circuit 20 is substantially the same as that of FIG. 3 (open cycle), but the duct 58 is extended by an extension 59' which extends as a counterflow around the nozzle 1 and the injection chamber 5 so as to cool them. Downstream from the section 59', the circuit passes through the heat exchanger 56 with the nuclear core 19, and then has a section 59 which feeds the injection chamber 5.

Thrust is produced by the hot hydrogen and the technology is identical for the nuclear core 19, while the induction device (loop 8) makes it possible to obtain results that are better in terms of specific impulse than those which can be obtained from conventional nuclear thermal engines.

For the same reasons as the nuclear chemical device of FIG. 3 which is likewise a direct injection device, this engine can be used only for upper stages.

Calculations can be performed in the same manner as for the direct injection nuclear chemical engine. For example, it is assumed that the maximum pressure of the nuclear core is 400 bars and that the outlet pressure from the turbine is not less than 10 bars. It is also assumed that the pump 10 raises the pressure of the hydrogen up to 10 bars for a temperature of 40 K at the inlet to the compressor 43.

The efficiency of the Brayton cycle is then equal to 0.651. The temperature of the hydrogen at the outlet from the compressor 43 is 115 K and it is 2000 K at the inlet to the turbine 44 whereas at the outlet from the turbine 44 it is at 697 K.

The heat produced by the nuclear core 19 is 1.8 GW, of which 1.17 GW is transformed into mechanical power. As a function of the transfer of heat along the walls of the nozzle 1, the heating power is less than 1.25 GW. Under these conditions, the total power supplied by the nuclear core is a little less than 3.05 GW.

In this case, the formula which gives the speed Ve at the outlet from the nozzle is modified to take account of the fact that there is no chemical reaction:

$$Ve = \sqrt{2\frac{P_N}{q}\left(1 - \left(\frac{Pe}{Pc}\right)^{\frac{\gamma-1}{\gamma}}\right)} \text{ with } \gamma = 1.4 \quad \text{(XI)}$$

from which:

Ve=8917 m/s

Isp=909 s

T=596,000 N

The considerably higher value for the specific impulse Isp compared with the FIG. 3 case is due to the fact that the energy is supplied to a gas of considerably smaller molar mass since the only gas used is hydrogen. The mass of the nuclear core is 15 tonnes as before.

The above results were obtained for a nuclear core operating at a temperature of up to 2000 K. If this result is compared with the calculated performance of a known nuclear thermal engine operating at the same mass flow rate of hydrogen, with the same nozzle, but using a temperature of 3000 K for the nuclear core, then the following results would be obtained for such an engine:

$$P_N = 14{,}300 \times (3000 - 40) \times 66.9 = 2.87\ GW$$

Ve=8650 m/s

Isp=881 s thrust T=578,000 N

However, technology that can make such a high temperature (3000 K) available in the nuclear core for conventional nuclear thermal propulsion is much more difficult to implement, but it could nevertheless be used in the context of the present invention.

Figure 5:
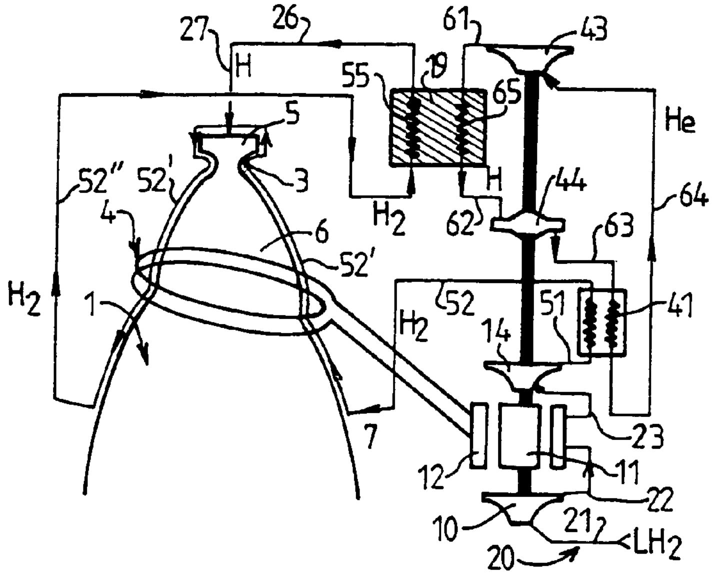

FIG. 5 relates to an induction nuclear thermal propulsion device provided with an induction loop 8 placed around the region 4 and with a closed power generator loop (as in the case of FIG. 2) but without using an oxygen circuit.

The hydrogen circuit 20 comprises the feed line 21, the pump 10, the duct 22, the cooling circuit 12 for the electricity generator 11, the line 23, the pump 14, the line 51, the heat exchanger 41, the line 52 which is extended downstream by heat exchange at 52' with the outlet nozzle 1. Therefore, the line 52' causes the hydrogen to pass through a heat exchanger 55 with the nuclear core 19, and then a line 26 feeding injection at 27 into the injection chamber 5.

The closed helium circuit comprises the heat exchanger 65, the duct 62, the turbine 44, a line 63, the heat exchanger 41 for exchanging heat with the hydrogen delivered by the pump 14, the line 64, the compressor 43, and the line 61 for feeding the heat exchanger 65, and so on.

The helium power loop is optimized in the same manner as for the induction nuclear chemical propulsion device of FIG. 2. The optimum ratio for compression is equal to 82.2, the efficiency of the power loop is 0.827, and the temperature at the outlet of the turbine 44 is equal to 346 K.

This loop is cooled by raising the temperature of the hydrogen from 40 K to 326 K in the heat exchanger 41, with the power transferred H then being equal to:

$$H = 14{,}300 \times (326 - 40) + 450{,}000 \times 66.9 = 304\ MW$$

The total power Pm delivered to the loop is equal to:

$$\frac{304}{0.173} = 1.75\ \text{GW}$$

and the available mechanical power Pmec is equal to 1.46 GW.

The heating power Pr applied to the hydrogen is equal to:

$$Pr = (2000 - 326) \times 14{,}300 \times 66.9 = 1.6\ GW$$

The total power $P_N$ supplied by the nuclear core 19 is equal to:

$$P_N = Pr + Pm = 3.35\ GW$$

This gives:

Ve=9320 m/s, Isp=967 s and T=635,000 N

The mass of the nuclear core 19 is about 16.7 tonnes.

The propulsion device of the present invention can use a plurality of the above-described cycles in succession so long as it is provided with different nozzles adapted to different modes of operation. For example, it is possible for a spacecraft to lift off the ground while implementing a closed loop and the induction nuclear chemical cycle which produces the highest thrust T, and once all of the oxygen has been consumed, the vehicle which is then much lighter, can be propelled using an induction nuclear thermal cycle which delivers lower thrust T but for which the specific impulse Isp is the greatest.

What is claimed is:

1. A propulsion device comprising:

an injection chamber for at least one propellant fluid, said injection chamber disposed upstream from a gas injection nozzle;

an inductive coil having at least one loop circumferentially surrounding the injection nozzle to heat the ejected gases by induction;

a high frequency electricity generator providing power to said inductive coil with alternating current, said power being transformed into heat in the ejected gas by induction, said heat generating added thrust by gas expansion in a diverging section of said nozzle disposed downstream of said inductive coil, wherein said nozzle comprises a first diverging region upstream of a second region circumferentially surrounded by said inductive coil and where the ejected gases are heated by induction, said second region where the ejected gases are heated by induction being followed downstream by a third diverging region of the nozzle, the first and third diverging regions of said nozzle contributing to the total thrust by expanding the gas in respective parts of said diverging nozzle;

wherein said second region represents a streamwise contour discontinuity between said first and third regions.

2. The propulsion device as in claim 1, wherein said alternating current is sinusoidal.

3. The propulsion device as in claim 1, wherein said at least one propellant fluid is hydrogen.

4. The propulsion device as in claim 2, wherein said at least one propellant fluid is hydrogen.

* * * * *